(12) United States Patent
Anglin et al.

(10) Patent No.: US 9,933,027 B2
(45) Date of Patent: Apr. 3, 2018

(54) DAMPED ANTI-ROTATIONAL SYSTEMS

(71) Applicant: United Technologies Corporation, Farmington, CT (US)

(72) Inventors: Christopher T. Anglin, Manchester, CT (US); Yuk-Kwan Brian Yuen, Wethersfield, CT (US); Russell B. Witlicki, Wethersfield, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 15/601,663

(22) Filed: May 22, 2017

(65) Prior Publication Data

US 2017/0261052 A1    Sep. 14, 2017

Related U.S. Application Data

(62) Division of application No. 14/660,537, filed on Mar. 17, 2015, now Pat. No. 9,689,444.

(60) Provisional application No. 61/977,812, filed on Apr. 10, 2014.

(51) Int. Cl.
   *F16D 65/02*   (2006.01)
   *F02C 7/00*    (2006.01)
   *F02C 7/36*    (2006.01)

(52) U.S. Cl.
   CPC ............... *F16D 65/02* (2013.01); *F02C 7/00* (2013.01); *F02C 7/36* (2013.01); *F05D 2260/90* (2013.01); *F05D 2260/96* (2013.01); *F16D 2300/22* (2013.01)

(58) Field of Classification Search
   CPC .................... F16D 65/02; F02C 7/00

USPC ......................................................... 74/575
See application file for complete search history.

(56) References Cited

U.S. PATENT DOCUMENTS

| 3,521,505 A |   | 7/1970  | Sebring |
| 3,540,306 A |   | 11/1970 | Nurmse |
| 4,128,992 A | * | 12/1978 | Egger ............... G04C 13/10 368/126 |
| 4,130,271 A | * | 12/1978 | Merriman ........... B66D 1/7431 192/46 |

(Continued)

FOREIGN PATENT DOCUMENTS

| DE | 3939609            | 6/1991 |
| DE | 102014219063 A1 * | 3/2016 |
| GB | 954158             | 4/1964 |

OTHER PUBLICATIONS

English Abstract of DE 102014219063 A1, Predrag, Mar. 2016.*

(Continued)

*Primary Examiner* — Vinh Luong
(74) *Attorney, Agent, or Firm* — Snell & Wilmer, L.L.P

(57) ABSTRACT

A damped anti-rotational system is provided comprising a pawl carrier having an axis of rotation, a pawl pivotably mounted to the pawl carrier on a pivot joint, the pawl having a contact portion and a counterweight portion, a stop pin axially disposed in the pawl carrier and configured to contact the contact portion of the pawl in response to radially inward movement of the pawl, wherein the stop pin is mounted to the pawl carrier at a forward portion of the stop pin and an aft portion of the stop pin, wherein a forward O ring is disposed on the forward portion of the stop pin and an aft O ring is disposed on the aft portion of the stop pin.

4 Claims, 6 Drawing Sheets

(56) References Cited

U.S. PATENT DOCUMENTS

| | | | | |
|---|---|---|---|---|
| 5,063,812 | A * | 11/1991 | Mercier | F02N 3/02 |
| | | | | 123/185.2 |
| 6,148,979 | A * | 11/2000 | Roach | F16D 41/12 |
| | | | | 192/45.1 |
| 6,729,203 | B2 * | 5/2004 | Wesling | B62K 23/04 |
| | | | | 74/473.14 |
| 9,809,145 | B1 * | 11/2017 | Ruan | B60P 7/0838 |
| 2007/0256906 | A1 * | 11/2007 | Jin | F16D 41/12 |
| | | | | 192/45.1 |
| 2008/0127772 | A1 * | 6/2008 | Sauter | B60T 1/005 |
| | | | | 74/575 |
| 2010/0299867 | A1 * | 12/2010 | Beskow | A47L 9/0427 |
| | | | | 15/390 |
| 2011/0109305 | A1 | 5/2011 | Galivel | |
| 2012/0111686 | A1 * | 5/2012 | Peterson | F16D 41/12 |
| | | | | 192/46 |

OTHER PUBLICATIONS

Extended European Search Report dated Aug. 11, 2015 in European Application No. 15162135.6.
USPTO; Restriction Requirement dated Feb. 15, 2016 in U.S. Appl. No. 14/660,537.
USPTO; Pre-Interview First Office Action dated Mar. 15, 2017 in U.S. Appl. No. 14/660,537.
USPTO; Notice of Allowance dated May 9, 2017 in U.S. Appl. No. 14/660,537.

* cited by examiner

DAMPED ANTI-ROTATIONAL SYSTEMS

CROSS-REFERENCE TO RELATED APPLICATIONS

This application is a Divisional of, and claims priority to, and the benefit of U.S. application Ser. No. 14/660,537, entitled "DAMPED ANTI-ROTATIONAL SYSTEMS", filed on Mar. 17, 2015 ('537 application). The '537 application claims priority to, and the benefit of U.S. Provisional Application No. 61/977,812, entitled "DAMPED ANTI-ROTATIONAL SYSTEMS," filed on Apr. 10, 2014. The aforementioned applications are incorporated herein in their entirety.

FIELD

The present disclosure relates to damped anti-rotational systems and methods, and more specifically, to damped anti-rotational systems and methods applicable to turbine engines.

BACKGROUND

Turbine engines typically windmill when idle. A turbine engine will often windmill due to wind blowing through the engine. Many times, wind enters through the engine outlet, causing the engine to windmill in reverse. Many turbine engines do not have a feature to prevent the reverse wind milling of the engine or utilize a complex and/or heavy system to accomplish this feature. Moreover, forward wind milling is often desired, for example, to enable the engine to more readily restart in flight. Reverse wind milling is not desired, for example, to reduce wear on the engine when idle. A turbine engine typically has a system to facilitate lubrication of rotating components when idle, but often this system only lubricates the rotating components when the engine is forward wind milling. Thus, reverse wind milling is often not desired.

SUMMARY

A damped anti-rotational system is provided comprising a pawl carrier having an axis of rotation, a pawl pivotably mounted to the pawl carrier on a pivot joint, the pawl having a contact portion and a counterweight portion, a stop pin axially disposed in the pawl carrier and configured to contact the contact portion of the pawl in response to radially inward movement of the pawl, wherein the stop pin is mounted to the pawl carrier at a forward portion of the stop pin and an aft portion of the stop pin, wherein a forward O ring is disposed on the forward portion of the stop pin and an aft O ring is disposed on the aft portion of the stop pin.

A damped anti-rotational system is provided comprising a pawl carrier having an axis of rotation, a pawl pivotably mounted to the pawl carrier on a pivot joint, the pawl having a contact portion and a counterweight portion, an stop pin axially disposed in the pawl carrier and configured to contact the contact portion of the pawl in response to radially inward movement of the pawl, wherein a central portion of the stop pin is wrapped in an elastic material.

A damped anti-rotational system is provided comprising a pawl carrier having an axis of rotation, a pawl pivotably mounted to the pawl carrier on a pivot joint, the pawl having a contact portion and a counterweight portion, a springboard radially protruding from the pawl carrier and configured to contact the contact portion of the pawl in response to radially inward movement of the pawl.

In various embodiments, the forward O ring is disposed on a forward groove of the stop pin. In various embodiments, the aft O ring is disposed on an aft groove of the stop pin. In various embodiments, forward portion of the stop pin is mounted in an indentation of the pawl carrier. In various embodiments, the aft portion of the stop pin is mounted in an aperture of the pawl carrier. In various embodiments, the forward O ring comprises a polymeric material. In various embodiments, there is an air gap between the pawl carrier and the forward portion of the stop pin. In various embodiments, the stop pin comprises at least one of stainless steel and Greek Ascoloy. In various embodiments, the forward O ring comprises an elastic material. In various embodiments, the aft O ring comprises an elastic material. In various embodiments, the stop pin comprises at least one of stainless steel and Greek Ascoloy. In various embodiments, a forward portion of the stop pin and an aft portion of the stop pin are exposed. In various embodiments, the elastic material is a polymeric material. In various embodiments, forward portion of the stop pin is mounted in an indentation of the pawl carrier. In various embodiments, the stop boss is integral to the pawl carrier. In various embodiments, the elastic material is coupled to the stop boss by an adhesive. In various embodiments, the elastic material is a polymeric material. In various embodiments, the pawl carrier comprises at least one of stainless steel and Greek Ascoloy.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, phrases such as "make contact with," "coupled to," "touch," "interface with" and "engage" may be used interchangeably.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

Figure 1:
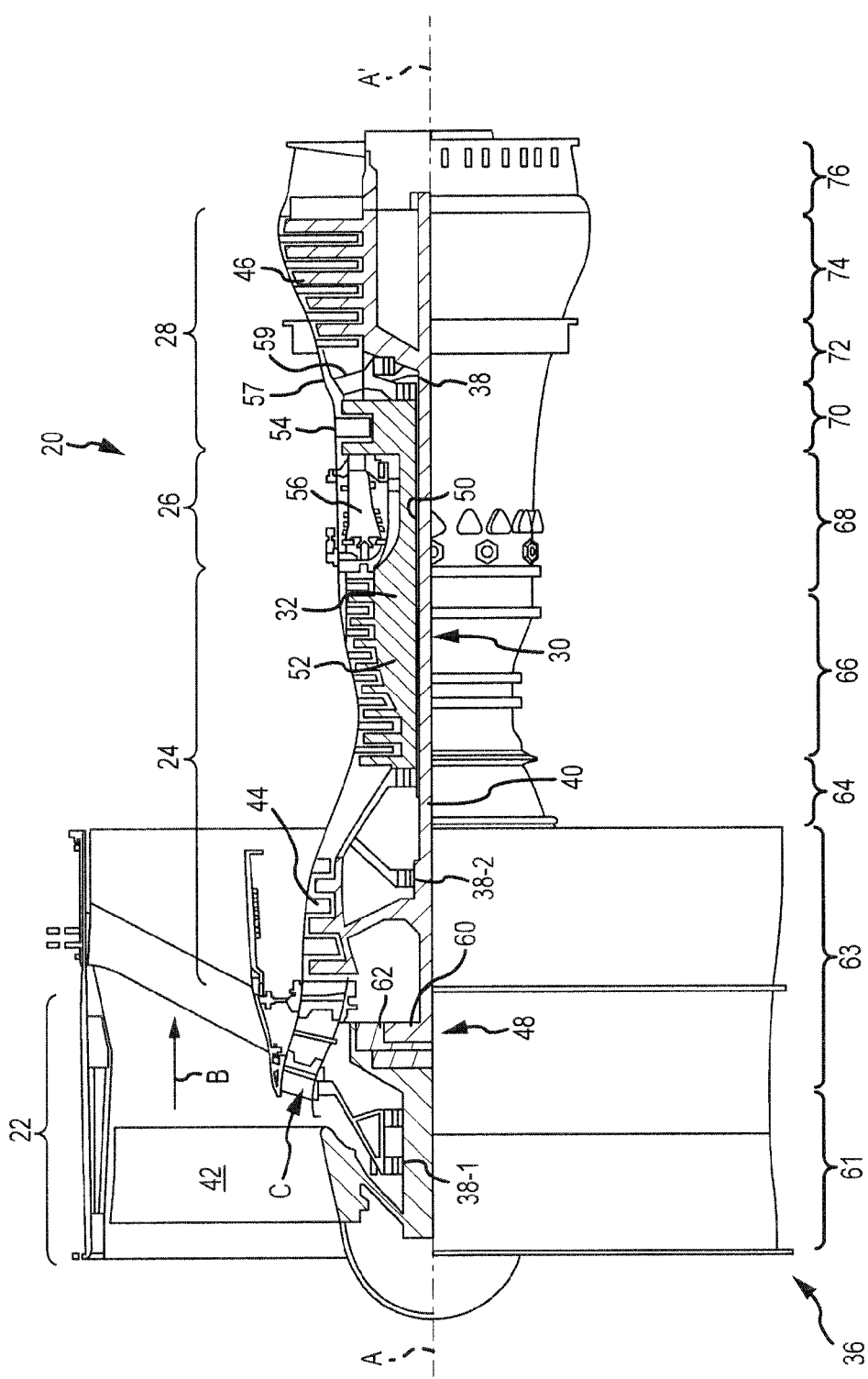
FIG. 1 illustrates a turbofan engine.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive air along a bypass flow-path B while compressor section 24 can drive air along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure (or second) compressor section 52 and high pressure (or second) turbine section 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Mid-turbine frame 57 includes airfoils 59 which are in the core airflow path. Turbines 46, 54 rotationally drive the respective low speed spool 30 and high speed spool 32 in response to the expansion.

Gas turbine engine 20 may be, for example, a high-bypass geared aircraft engine. In various embodiments, geared architecture 48 may be an epicyclic gear train, such as a star gear system (sun gear in meshing engagement with a plurality of star gears supported by a carrier and in meshing engagement with a ring gear) or other gear system. Gear architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about 5:1. Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

With reference to FIG. 1, gas turbine engine 20 may generally include multiple of modules including for example, a fan case module 61, an intermediate case module 63, a Low Pressure Compressor (LPC) module 64, a High Pressure Compressor (HPC) module 66, a diffuser module 68, a High Pressure Turbine (HPT) module 70, a mid-turbine frame (MTF) module 72, a Low Pressure Turbine (LPT) module 74, and a Turbine Exhaust Case (TEC) module 76.

As described above, an anti-rotational device may be used to prevent reverse wind-milling in a turbofan engine. In particular, an anti-rotational device may be disposed in the low pressure turbine to prevent rotation in an undesired direction. For example, an anti-rotational device may be configured to allow rotation in a first direction (e.g., clockwise) and to limit all or nearly all rotation in a second direction (e.g., counter clockwise). Moreover, an anti-rotational device may be configured to limit mechanical contact at or above certain angular velocities. In that regard, lower angular velocities may be associated with a level of mechanical contact between various components but, after a low pressure turbine achieves a given angular velocity, the contact may be reduced or eliminated. However, such anti-rotational device may exhibit undesired vibration, for example, when rotation proceeds at an angular velocity below a predetermined angular velocity.

Figure 2A:
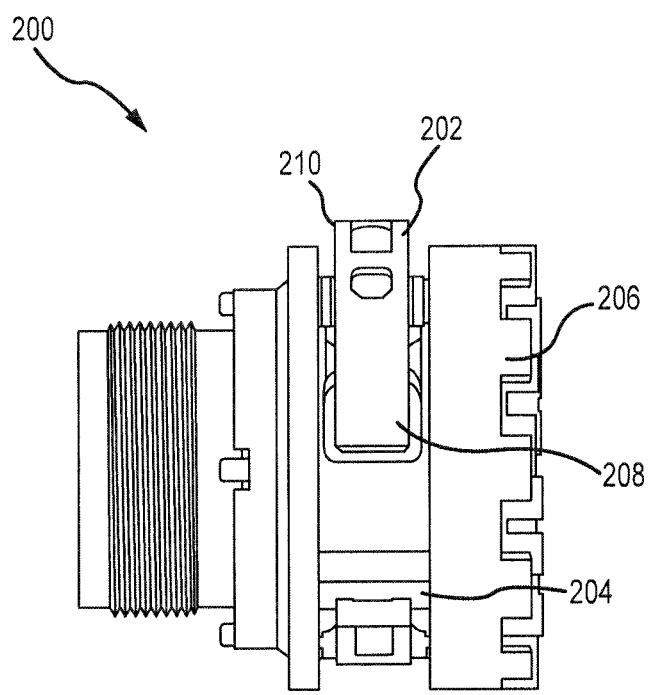
FIGS. 2A and 2B illustrate a pawl carrier according to various embodiments.
Figure 2B:
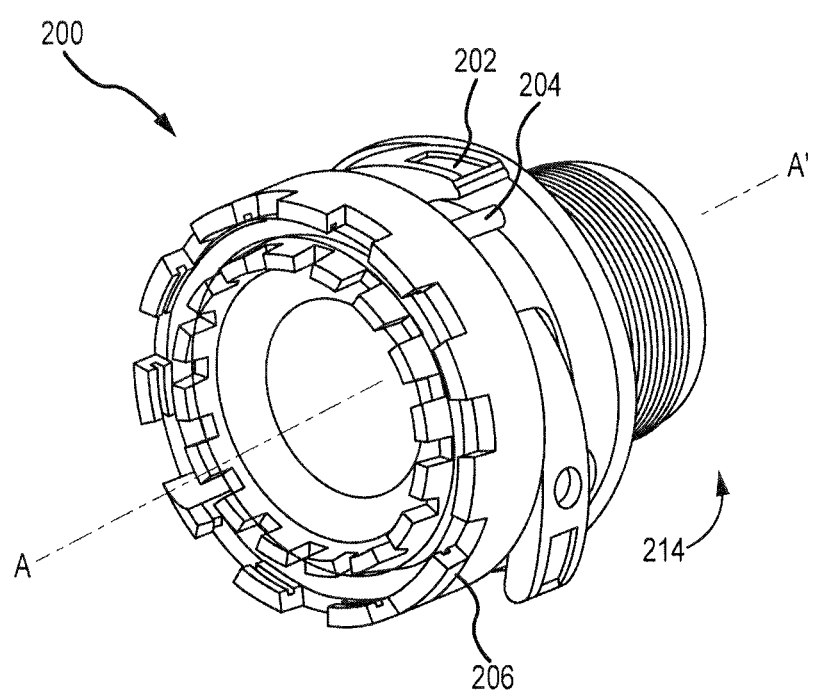

With reference to FIGS. 2A and 2B, pawl system 200 is shown. Pawl carrier 206 is shown coupled to pawl 202. Stop pin 204 is shown disposed in pawl carrier 206. Pawl carrier 206 may comprise any number of pawls, for example, from 1 pawl to 20 pawls. In various embodiments, any number of pawls may be used, and thus the selection of the appropriate number of pawls and the spacing of the pawls may be tuned in response to design weight constraints, footprint, and other manufacturing concerns. In various embodiments, pawl carrier 206 comprises three pawls distributed uniformly about the circumference of pawl carrier 206.

Pawl 202 may be comprised of any suitable material. For example, pawl 202 may be comprised of stainless steel such as 300M stainless steel and/or a chromium-nickel-tungsten martensitic alloy (also known as Greek Ascoloy). In various embodiments, various components disclosed herein may comprise 300M stainless steel and/or chromium-nickel-tungsten martensitic alloy (also known as Greek Ascoloy) and/or austenitic nickel-chromium-based alloy such as Inconel® which is available from Special Metals Corporation of New Hartford, N.Y., USA, or any other metal, for example, titanium. However, in further embodiments, various components of anti-rotational devices may comprise other metals, such as tungsten, aluminum, steel, or alloys, though they may further comprise numerous other materials configured to provide mechanical resiliency and/or support of the system when subjected to wear in an operating environment or to satisfy other desired electromagnetic, chemical, physical, or biological properties such as strength, durability, ductility, heat tolerance, thermal dissipation, and footprint constraints, among others. In various embodiments, various portions of anti-rotational devices as disclosed herein are made of different materials or combinations of materials, and/or may comprise various coatings.

Figure 3A:
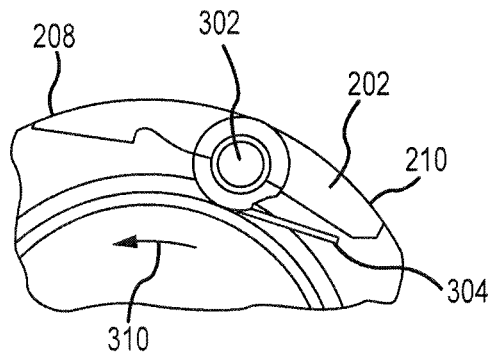
FIGS. 3A and 3B illustrate a pawl and pawl carrier according to various embodiments.
Figure 3B:
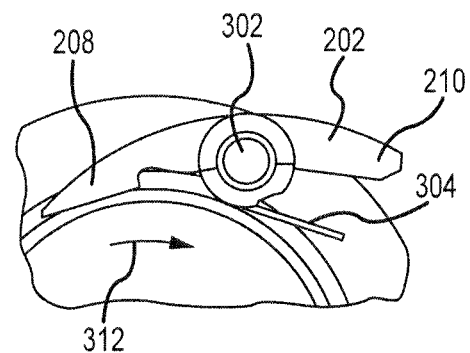

With brief reference to FIGS. 3A and 3B, pawl 202 is shown pivotably mounted to pawl carrier 206 on a pivot joint 302. Pivot joint 302 allows pawl 202 to rotate freely about pivot joint 302. Pivot joint 302 may comprise any suitable joint that is configured to allow pawl 202 to pivot. For example, a post and bushing mating may be used as pivot joint 302. Pivot joint 302 may be suitably lubricated, for example, using a solid state lubricant and/or liquid lubricant. Pivot joint 302 may also comprise one or more materials that are coated with or comprised of a low friction material. For example, portions of pivot joint 302 may be coated with polytetrafluoroethylene ("PTFE"). In various embodiments, pivot joint 302 is disposed at or near the geometric center of pawl 202.

With continued reference to FIGS. 2A and 3, pawl 202 comprises counterweight portion 208 and contact portion 210. Pawl 202 may comprise a single integral piece comprising counterweight portion 208 and contact portion 210. Counterweight portion 208 may be integral to pawl 202 and may be formed by any suitable means, for example, by forging, casting, stamping, negative manufacturing techniques, additive manufacturing techniques and/or other methods of manufacture. Counterweight portion 208 may be configured such that the center of mass of pawl 202 is more proximate a terminus of counterweight portion 208 than a terminus of contact portion 210. Counterweight portion 208 may be configured to have a "scoop" or cut out and/or a portions of greater thickness and/or mass when compared with other portions of pawl 202.

Torsion spring 304 may be disposed to exert a radial outward force upon pawl 202. In that regard, torsion spring 304 exerts a rotational force on pawl 202 that tends to pivot pawl 202 about pivot joint 302 in a radially outward direction. Torsion spring 304 may be made from any suitable material, for example, stainless steel.

With reference to FIG. 3B, upon rotation in clockwise direction 312, contact portion 210 may be directed radially outward with respect to pawl carrier 206. With reference to FIG. 2B, as pawl carrier 206 rotates in counterclockwise direction 214 at an angular velocity below a predetermined angular velocity, each pawl may contact structures, such as a ratchet, disposed radially outward of pawl carrier 206. In that regard, pawl 202 may periodically be deflected after contact with other contact structures.

In that regard, a stop pin may be disposed in an axial direction and provide a contact point for pawl 202 and contact portion 210 in particular, to prevent pawl 202 from contacting pawl carrier 206. Thus, stop pin 204 is configured to interact with contact portion 210 in response to radially inward movement of pawl 202.

Figure 4:
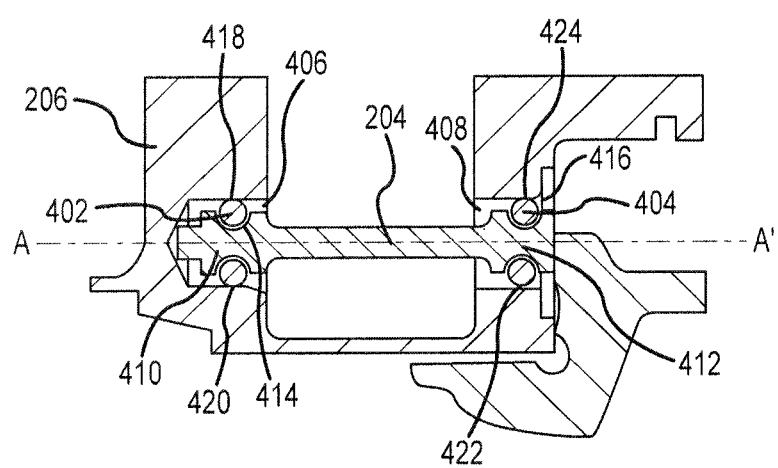
FIG. 4 illustrates a stop pin and pawl carrier according to various embodiments.

FIG. 4 illustrates a cross sectional view of stop pin 204 along the line A-A' shown in FIG. 2B. Line A-A' is disposed such that point A is forward of point A'. With reference to FIG. 4, stop pin 204 is mounted to pawl carrier 206 at forward portion 410 of stop pin 204 and at aft portion 412 of the stop pin 204. Forward portion 410 of the stop pin 204 is mounted in an indentation 406 and has forward groove 414. Aft portion 412 of the stop pin 204 is mounted in an indentation 408 and has aft groove 416. O ring 402 is disposed in forward groove 414 and O ring 404 is disposed in aft groove 416. Stated another way, O ring 402 is wrapped around forward groove 414 and O ring 404 is wrapped around aft groove 416.

O ring 402 and O ring 404 may be comprised of any suitable material. In various embodiments, O ring 402 and O ring 404 may comprise an elastic material and/or a deformable material. In various embodiments, O ring 402 and O ring 404 may comprise a polymeric material, for example, a thermoplastic. In various embodiments, O ring 402 and O ring 404 may comprise PTFE.

O ring 402 and O ring 404, in various embodiments, may take geometries other than that of a ring or an "O." In that regard, O ring 402 and O ring 404 may have one or more of a triangular profile and a rectangular profile.

In that regard, in various embodiments, stop pin 204 may not be in contact with pawl carrier 206. For example, contact points 418 and 420 show contact between O ring 402 and pawl carrier 206. Stop pin 204 does not contact pawl carrier 206 proximate forward portion 410 of the stop pin 204. Similarly, contact points 422 and 424 show contact between O ring 404 and pawl carrier 206. Stop pin 204 does not contact pawl carrier 206 proximate aft portion 412 of the stop pin 204. In various embodiments, in response to impact from a pawl, stop pin 204 may cause one or more of O ring 402 and O ring 404 to deform. In such a scenario, stop pin 204 may contact pawl carrier 206 proximate one or more of aft portion 412 and forward portion 410 of stop pin 204.

Figure 5:
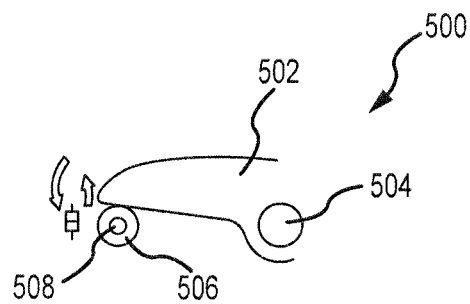
FIG. 5 illustrates a wrapped stop pin according to various embodiments.

With reference to FIG. 5, damped pawl system 500 is illustrated. Pawl 502 is illustrated as rotating about pivot joint 504. Stop pin 508 is supported by a pawl carrier, though the pawl carrier is not shown for clarity. Stop pin 508 is wrapped in elastic material 506. In that regard, in response to rotation of pawl 502 in a counterclockwise direction, pawl 502 makes contact with all or at least a position of elastic material 506. Stop pin 508 may be mounted to a pawl carrier directly or may include O rings disposed between at least a portion of stop pin 508 and the pawl carrier.

Elastic material 506 may be comprised of any suitable material. In various embodiments, elastic material 506 may comprise an elastic material and/or a deformable material. In various embodiments, elastic material 506 may comprise a polymeric material, for example, a thermoplastic and/or a rubber material, whether natural or synthetic. In various embodiments, elastic material 506 may comprise PTFE.

Elastic material 506 may be configured to damp the impact of pawl 502 on stop pin 508. By lessening the rebound of pawl 502 after contact with stop pin 508, pawl 502 may oscillate with less amplitude than would be conventional.

Figure 6:
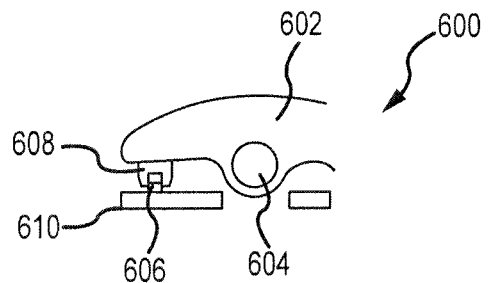
FIG. 6 illustrates a stop boss according to various embodiments.

With reference to FIG. 6, damped pawl system 600 is illustrated. Pawl 602 is illustrated as rotating about pivot joint 604. Stop boss 606 is shown as integral to a pawl carrier 610. Stop boss 606 may therefore comprise a raised surface or protrusion from the surface of the pawl carrier. Stop boss 606 is capped by elastic material 608. In that regard, in response to rotation of pawl 602 in a counterclockwise direction, pawl 602 makes contact with all or at least a portion of elastic material 608.

Elastic material 608 may be comprised of any suitable material. In various embodiments, elastic material 608 may comprise an elastic material and/or a deformable material. In various embodiments, elastic material 608 may comprise a polymeric material, for example, a thermoplastic and/or a rubber material, whether natural or synthetic. In various embodiments, elastic material 608 may comprise PTFE.

Elastic material 608 may be configured to damp the impact of pawl 602 on stop boss 606. By lessening the rebound of pawl 602 after contact with stop boss 606, pawl 602 may oscillate with less amplitude than would be conventional.

Figure 7:
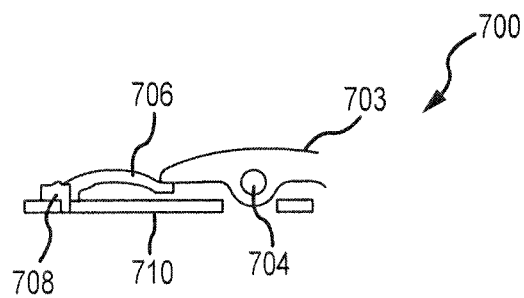
FIG. 7 illustrates a springboard stop according to various embodiments.

With reference to FIG. 7, damped pawl system 700 is illustrated. Pawl 703 is illustrated as rotating about pivot joint 704. Stop attachment 708 is shown a point on a pawl carrier 710. Stop attachment 708 may therefore comprise a raised surface or protrusion from the surface of the pawl carrier or may merely represent the point on pawl carrier where springboard 706 is coupled to the pawl carrier. Stop attachment 708 is coupled to springboard 706. In that regard, in response to rotation of pawl 703 in a counterclockwise direction, pawl 703 makes contact with all or at least a portion of springboard 706. Springboard 706 extends circumferentially towards pawl 703. Springboard 706 may contact pawl carrier in response to contact with pawl 703.

Springboard 706 may be comprised of any suitable material. In various embodiments, springboard 706 may comprise an elastic material and/or a deformable material. In various embodiments, springboard 706 may comprise a polymeric material, for example, a thermoplastic and/or a rubber material, whether natural or synthetic. In various embodiments, springboard 706 may comprise PTFE.

Springboard 706 may be configured to damp the impact of pawl 703 on pawl carrier. By lessening the rebound of pawl 703 after contact with the pawl carrier, pawl 703 may oscillate with less amplitude than would be conventional.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A damped anti-rotational system comprising:
a pawl carrier having an axis of rotation;
a pawl pivotably mounted to the pawl carrier on a pivot joint, the pawl having a contact portion and a counterweight portion; and
a stop pin axially disposed in the pawl carrier and configured to contact the contact portion of the pawl in response to radially inward movement of the pawl,
wherein a central portion of the stop pin is wrapped in an elastic material, wherein a forward portion of the stop pin is mounted in an indentation of the pawl carrier.

2. The damped anti-rotational system of claim 1, wherein the stop pin comprises at least one of stainless steel and Greek Ascoloy.

3. The damped anti-rotational system of claim 2, wherein the forward portion of the stop pin and an aft portion of the stop pin are exposed.

4. The damped anti-rotational system of claim 1, wherein the elastic material is a polymeric material.

* * * * *